United States Patent [19]

Braun

[11] Patent Number: 4,701,652

[45] Date of Patent: Oct. 20, 1987

[54] DRIVE DEVICE, PARTICULARLY FOR TEXTILE MACHINES

[75] Inventor: Ernst Braun, Biberach an der Riss, Fed. Rep. of Germany

[73] Assignee: SKF-Textilmaschinen-Komponensten GmbH, Stuttgart, Fed. Rep. of Germany

[21] Appl. No.: 872,598

[22] Filed: Jun. 10, 1986

[30] Foreign Application Priority Data

Jun. 11, 1985 [DE] Fed. Rep. of Germany ....... 3520889

[51] Int. Cl.⁴ .............................................. H02K 7/20
[52] U.S. Cl. ..................................... 310/112; 310/114
[58] Field of Search ...................... 310/112, 114, 126

[56] References Cited

U.S. PATENT DOCUMENTS 1,197,728  9/1916  Fisher ................................... 310/112
1,612,330 12/1926  Trumpler ......................... 310/112 X
1,694,985 12/1928  Schrage ........................... 310/112 X
3,465,185  9/1969  Rollig ................................... 310/112

*Primary Examiner*—Donovan F. Duggan
*Attorney, Agent, or Firm*—Hopgood, Calimafde, Kalil, Blaustein & Judlowe

[57] ABSTRACT

A drive device consists of at least two three-phase electric motors arranged paraxially alongside of each other, and each of the stators (6) thereof has its own winding (11). A single stack of laminations integrally serves each stator (6), in that each lamination is cut-out to serve plural stators. The winding (11) and the lay-out of stator-slots (7) and the supply-phase connection to each phase of the three-phase supply network is so selected for all motors that the magnetic-flux maxima of the same polarity in the yokes (9) of the stators (6), which maxima rotate in the direction of rotation of the motor, pass at different times through the location of minimum spacing between directly adjacent stators (6).

7 Claims, 3 Drawing Figures

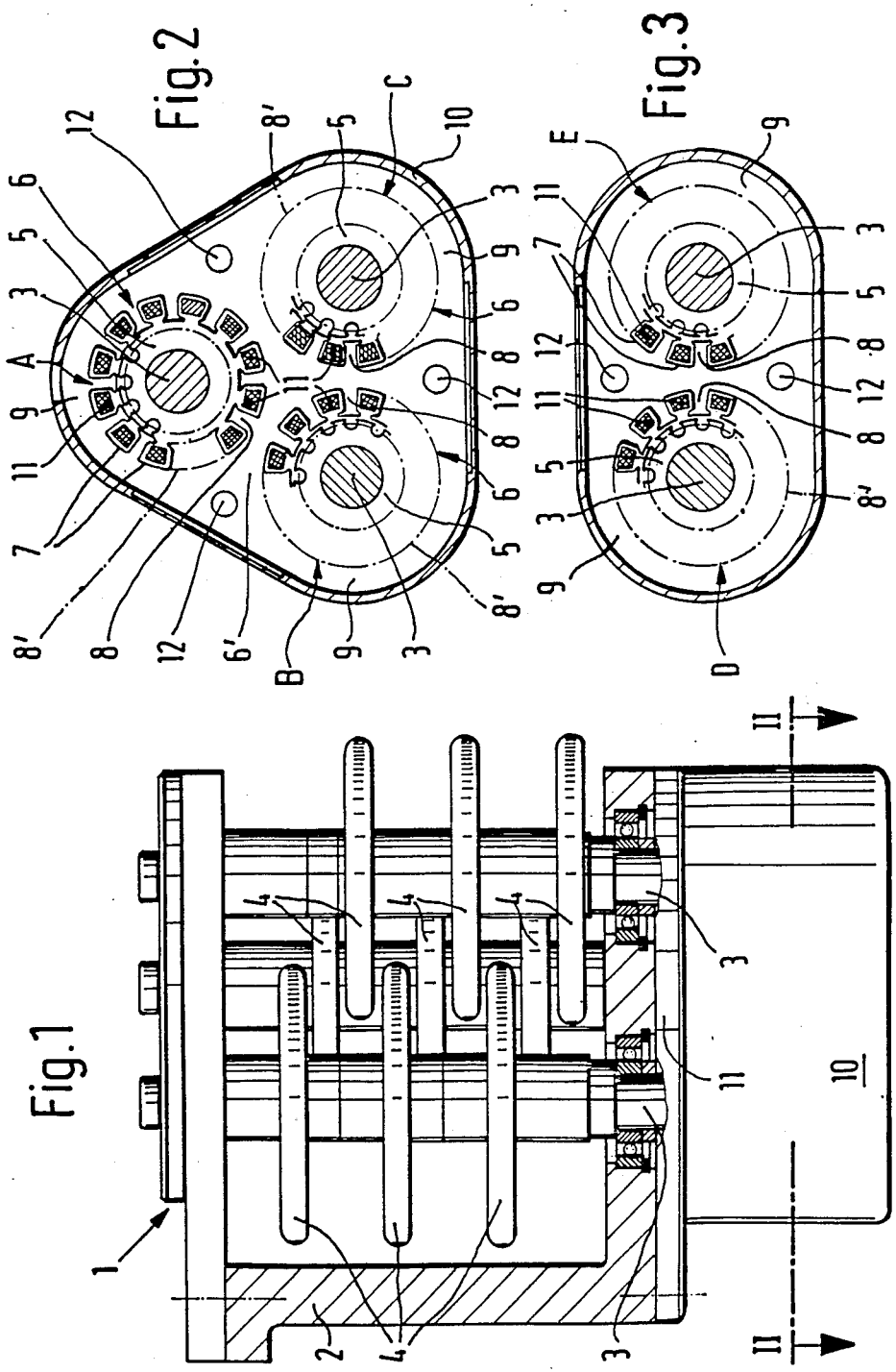

DRIVE DEVICE, PARTICULARLY FOR TEXTILE MACHINES

BACKGROUND OF THE INVENTION

The present invention relates to a drive device, particularly for textile machines, wherein at least two three-phase electric motors are arranged alongside each other with their axes parallel. The stators of these motors are each provided with one winding, and are formed as a stack of laminations, wherein the laminations of each stator are integrally formed with the correseponding laminations of all other stators.

If two or more shafts are arranged with their axes parallel to and alongside each other with a relatively small center-to-center distance, space considerations can make it difficult or out of the question to provide a separate electric motor, unique for the individual drive of each one of these shafts. West German Pat. No. 367,938 addresses the problem of individually driving the spindles of spinning machines in which the center-to-center distance between the spindles is very small, by proposing that the respective stacks of stator laminations for each of the plural three-phase drive motors be arranged in a common housing in order to eliminate housing space between two stator laminations which are immediately adjacent each other. In addition, it is proposed that the laminations of each stator be developed integral with the corresponding laminations of the directly adjacent stator, whereby a further saving in space is obtained.

However, there are certain other situations, for example in work components of texturing machines, in which center-to-center distances between shafts of a clustered plurality are so short that, even if one dispenses with a separate housing, the space available is not sufficient for the motors necessary for an individual drive of each shaft. Therefore, each of these shafts carries a pulley, and a toothed belt over all such pulleys of the cluster is relied upon to drive all the corresponding shafts. In addition, one of the shafts has a drive pulley, which is subject to the constant side thrust of a flat-belt drive. Such belt drives have the disadvantage not only of relatively great losses of energy but also of the short life which is characteristic of toothed belts; these facts mean relatively high maintenance expense and relatively frequent shut-down of the component, thus definitely reducing the effectiveness of the texturing machine.

BRIEF STATEMENT OF THE INVENTION

The object of the present invention is to provide a drive device by means of which each spindle of a clustered plurality of spindles can be individually driven by its own single three-phase motor, even when the shafts to be driven are closely spaced, as is the case, for example, in a texturing machine. This object is achieved by a drive device in which a single stack of like laminations serves the stator function of each of a plurality of individual three-phase motors, and in which the electrical winding for each stator is so physically related in position and phase to the winding of the adjacent stator as to assure that flux maxima of the same polarity will not occur at the same time at locations of closest adjacency between individual stator formations.

Since flux maxima of adjacent stators do not occur at the same time at locations of closest stator-to-stator adjacency, the yokes of the individual stators do not have to be of circumferentially continuous and uniform width. Rather, the phase shift of the stator-yoke fluxes and therefore the shift in the time of flux passage through the location of closest spacing between stators can be so selected that the distance from the bottom of the slot of one stator to the bottom of the slot of the immediately adjacent stator need be equal only to the width of the yoke of a single stator, since this region of the laminations is available to serve a yoke function, because all laminations serve all stators, without any air gap between stators. In the case of a two-pole embodiment of the motors, wherein diameters are very small, a reduction by half of the yoke width is of considerable importance in realizing a minimum axial spacing.

If three motors are to be arranged so that their longitudinal axes form the edges of a prism having the cross-section shape of an equilateral triangle, as is the case in texturing modules of texturing machines, then, with a two-pole embodiment of all three motors, a 120° phase shift in space of like-polarity flux maxima is optimal.

On the other hand, if the motors are arrayed in a straight row alongside of each other, then it is most favorable to provide a winding relationship such that the flux maxima of directly adjacent stators are phase offset by one pole pitch, i.e., by 180°.

An even greater reduction of the axial spacing of directly adjacent motors can be obtained without locally increasing field strength in the stator yoke by so configuring the stator lamination cut-outs that a tooth of one stator is aligned with a tooth of the adjacent stator, at the lcoation of least spacing between two adjacent motors. These two teeth then enable the yoke flux to discharge itself (i.e., to flow) at the location of least distance between the two immediately adjacent stators. This discharge effect can be utilized for a still further reduction of requisite width of the yoke.

DETAILED DESCRIPTION

The invention will be described in detail with reference to the accompanying drawing, in which:

FIG. 1 shows a texturing module partially in plan view and partially in longitudinal section, and incorporating a drive device of the invention;

FIG. 2 is a section along the line II—II of FIG. 1; and

FIG. 3 is a view similar to FIG. 2, for a modified configuration.

The texturing module of FIG. 1 includes a working part, designated generally as 1, through which thread to be textured is passed; this working part is developed in known manner. Three identically shaped shafts 3 are mounted parallel to and spaced from each other in a mount 2. The arrangement of the shafts is so selected that their longitudinal axes define the edges of a prism of equilateral cross section. Each shaft 3 fixedly carries a plurality of longitudinally spaced disks 4, of diameter greater than the space between shafts; and the disks 4 of the respective shafts 3 are in staggered interlace, with disks 4 of one shaft in adjacent overlap with disks 4 of the other two shafts 3.

The rotor 5 of a different one of three threephase asynchronous motors is coupled, as by force-fit connection, to each one of the three shafts 3. Each rotor 5 is of short-circuit variety, e.g., squirrelcage, and stators 6 corresponding to the rotor 5 are defined by a single stack of plural laminations, of like configuration. Thus, as shown in FIG. 2, each lamination 6 extends to a limiting outer wall or housing 10 and has three stamped circular cut-outs for reception of the respective rotors 5, the centers of the cut-outs being aligned with the longitudinal axes of the shafts so that they also define the corners of the same equilateral triangle. Stator slots 7 are in spaced array, concentric about the axis of each cut-out; and the number of stator slots is 12, in the embodiment shown. As FIG. 2 also shows, the stator slots 7 are so arranged in space that a stator tooth 8 of each stator is at the location of least distance between two directly adjacent stator cut-outs, i.e., aligned with the geometric lines which connect the cross-section intercepts of the longitudinal axes of the three stators 6. Still further, it is noted that the distance between stator cut-outs, i.e., between the dedendum or root circle 8' of stator teeth 8 of adjacent stator cut-outs, at the point of least spacing between stator cut-outs, is somewhat less than the width of each stator yoke 9 in its sector of adjacency to the housing 10. As seen in FIG. 1, the housing 10 has a flange 11 secured to the mount 2 and, as seen in FIG. 2, the housing 10 has the cross-sectional shape of an equilateral triangle with rounded corners, the inner radius of which is equal to the outer radius of the stator yokes 9.

The relatively short distance of stator-tooth dedenda 8' from each other makes it possible to develop the three motors with their axial spacing determined by the spacing of shafts 3; at the same time, the yoke field strength, even at locations of least spacing between dedenda 8', does not exceed the maximum value present in the corner sectors 9. This result is primarily due to the fact that the three strands of each stator winding are so disposed in the slots 7 of one stator with respect to those of the other two stators, and the strands for each stator winding are so connected to individual phases of the three-phase supply network, that like-polarity maxima of stator-yoke fluxes are at 120° offset from each other. Thus, for example, if one proceeds from the position in space of the yoke-flux maximum for stator A at the top of FIG. 2, then the yoke-flux maximum of like polarity for stator B at the bottom left of FIG. 2 is at 120° counterclockwise offset, while the yoke-flux maximum of like polarity for stator C at the bottom right of FIG. 2 is at 120° clockwise offset. Thus, rather than connect the strands of the windings of the individual stators, with the same spatial arrangement and to the same network phases, it is sufficient to interchange the phase connections so that strands connected to the same phase are physically spaced 120° from each other. By this technique of phase displacement of the yoke-flux maxima, the result is obtained that stator fluxes in the regions of least space between dedenda 8' never are so additive as to result in values which exceed the flux maxima of each individual stator.

The somewhat shorter distance between dedenda 8' (at the narrowest space between dedenda), as compared with yoke width at the corner sectors 9 is possibly due to the fact that, at the narrowest space between dedenda, the magnetic flux between adjacent dedenda can discharge into the adjacent aligned teeth 8 of adjacent stators at each of these narrow spacings.

Piercings 12 in each lamination 6' accommodate rivets (not shown) for holding the stack of laminations together and are seen in FIG. 2 to have been located between the sector-shaped yoke sections 9 of adjacent stators. They therefore do not affect the magnetic conditions in the stators 6.

It will be seen that the described configuration and arrangement makes it possible to replace the toothed belts which have previously been the only way to drive closely spaced spindles or spindle clusters; the single two-pole asynchronous motor needed to drive the belt is also replaced. The new arrangement results in a maintenance-free drive, with each individual drive torque centered on its own associated one of the plural shaft axes; the resultant saving in energy is also considerable, becoming cumulatively significant in view of the large number of texturing modules in a given texturing machine.

It will be seen that the invention lends itself to further embodiments, wherein other pluralities of clustered motors utilize stator laminations in common. For example, in the configuration of FIG. 3, two motors D-E are in linear array, with adjacent stator teeth of adjacent stators in alignment at locations of shortest spacing between the involved dedenda. In this case, the phase offset between windings of the respective stators is suitably 180°, so that at any given instant of flux maximum of one polarity in that tooth 20 of one stator (which tooth in aligned-adjacent relation to the tooth 20' of the other stator), the said tooth 20 is at that same instant confronted with a flux maximum of opposite polarity in the said adjacent tooth 20'.

What is claimed is:

1. A drive device, particularly for textile machines, wherein at least two three-phase electric motors are arranged paraxially alongside each other and have single-winding stators which, are formed as a single stack of laminations, and wherein the laminations of each stator are developed integrally with the corresponding laminations of all other stators, characterized by the fact that the association of the stator winding (11) with the stator slots (7) and with the phases of the three-phase supply network is so selected for connection to all motors that like-polarity maxima of the magnetic fluxes in the yokes (9) of the stators (6) which travel in the direction of rotation of the motor pass at different times through the location of shortest spacing between directly adjacent stators (6).

2. A drive device according to claim 1, characterized by the fact that the number of said motors is three and that said motors are so arranged that their longitudinal axes define the edges of a prism which has a cross-section in the shape of an equilateral triangle and that, in the case of a two-pole embodiment of all three motors, phase shift in space of like-polarity maxima of the magnet fluxes in the respective stators is at 120°.

3. A drive device according to claim 1, characterized by the fact that the motors are arranged in a linear array and the maximum of the magnetic stator-yoke flux is shifted by one pole pitch from the maximum of the same polarity of the magnetic stator-yoke flux of the directly adjacent motor.

4. A drive device according to claim 1, characterized by the fact that both stators (6) have a tooth (8) at the location of shortest distance between two directly adjacent motors.

5. A drive device according to claim 1, characterized by the fact that each stator (6) has a tooth (8) adjacent a tooth (8) of the other stator (6) and that both of said teeth are symmetrically configured with respect to a geometric straight line connecting the axes of the respective motors.

6. A drive device according to claim 5, in which each tooth (8) of each stator (6) has a slot between adjacent teeth of its stator and that the shortest distance between the bottom of a slot in the other stator is approximately the yoke width for each one of the involved stators.

7. As an article of manufacture, an assembly of three three-phase electric motors, comprising a single registering stack of like stator laminations wherein three circular cut-outs define inner profiles for the individual stators of the respective motors, said cut-outs being centered at the corners of an equilateral triangle, thereby defining three parallel motor axes through the registering centers, there being a like plurality of spaced winding slots radially outwardly characterizing each circular cut-out, thereby defining stator teeth between adjacent slots, said plurality being an integral multiple of six and one tooth of each stator being aligned on the geometric orientation of each line between centers of adjacent axes, whereby teeth of adjacent stators are at the locations of shortest spacing between adjacent stators; three-phase windings in the slots of the respective stators, the phases of the respective windings being so selected that, when connected to a single three-phase voltage source, like-polarity rotating maxima of the magnetic fluxes in the yokes of the respective stators pass at different times through said locations of shortest spacing; and rotors mounted within said stators for rotation on each of said axes in the rotational direction of the involved maxima.

* * * * *